United States Patent
Tombe et al.

(10) Patent No.: US 10,556,350 B2
(45) Date of Patent: Feb. 11, 2020

(54) ASSEMBLY BODY MANUFACTURING DEVICE AND ASSEMBLY BODY MANUFACTURING METHOD

(71) Applicant: MITSUBISHI HEAVY INDUSTRIES, LTD., Tokyo (JP)

(72) Inventors: Toshihiro Tombe, Tokyo (JP); Naoki Goto, Tokyo (JP); Makoto Hirai, Tokyo (JP); Takuya Goto, Tokyo (JP); Takahiro Inagaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 254 days.

(21) Appl. No.: 15/576,907

(22) PCT Filed: Jul. 12, 2016

(86) PCT No.: PCT/JP2016/070602
§ 371 (c)(1),
(2) Date: Nov. 27, 2017

(87) PCT Pub. No.: WO2017/033604
PCT Pub. Date: Mar. 2, 2017

(65) Prior Publication Data
US 2018/0147729 A1    May 31, 2018

(30) Foreign Application Priority Data
Aug. 27, 2015 (JP) .................................. 2015-167986

(51) Int. Cl.
*B25J 13/02* (2006.01)
*B25J 13/00* (2006.01)
(Continued)

(52) U.S. Cl.
CPC ............... *B25J 13/02* (2013.01); *B23P 19/04* (2013.01); *B25J 9/0084* (2013.01); *B25J 9/1612* (2013.01);
(Continued)

(58) Field of Classification Search
CPC . B25J 13/02; B25J 13/00; B25J 13/089; B25J 9/0084; B25J 9/1612; B25J 9/1669;
(Continued)

(56) References Cited

U.S. PATENT DOCUMENTS 5,910,894 A * 6/1999 Pryor ............... G05B 19/41875
219/121.64
6,170,157 B1 * 1/2001 Munk ..................... B23P 21/00
244/123.1
(Continued)

FOREIGN PATENT DOCUMENTS

DE    202013101036 U1    8/2014
EP         2824439 A2    1/2015
(Continued)

OTHER PUBLICATIONS

International Search Report in PCT/JP2016/070602, dated Oct. 18, 2016. 5pp.
(Continued)

*Primary Examiner* — Bayan Salone
(74) *Attorney, Agent, or Firm* — Kanesaka Berner & Partners

(57) ABSTRACT

A long member assembling device has hand parts configured to grip a long member, arm parts and trunk parts configured to adjust a position of each of the hand parts, a hand part configured to grip the long member, the hand part numbering less than the hand parts, an arm part and a trunk part configured to move the hand part and adjust a position of the hand part gripping the long member, the arm part and the
(Continued)

trunk part having higher positioning accuracy than the hand parts, and a control unit configured to, on the basis of an original shape of the long member stored in a memory, drive the arm parts and the trunk parts to adjust the positions of the hand parts and the hand part such that the shape of the long member gripped by the hand parts matches the original shape.

12 Claims, 11 Drawing Sheets

(51) Int. Cl.
    *B25J 13/08*     (2006.01)
    *B25J 9/16*     (2006.01)
    *B21J 15/00*     (2006.01)
    *B21J 15/42*     (2006.01)
    *B21J 15/14*     (2006.01)
    *B64F 5/10*     (2017.01)
    *B23P 19/04*     (2006.01)
    *B23P 19/10*     (2006.01)
    *B25J 9/00*     (2006.01)
    *B25J 15/00*     (2006.01)

(52) U.S. Cl.
    CPC ........... *B25J 9/1669* (2013.01); *B25J 13/089* (2013.01); *B25J 15/00* (2013.01); *B64F 5/10* (2017.01); *B23P 2700/01* (2013.01); *B25J 9/1687* (2013.01); *Y10S 901/09* (2013.01); *Y10S 901/30* (2013.01); *Y10S 901/47* (2013.01)

(58) Field of Classification Search
    CPC . B25J 9/1687; B21J 15/00; B21J 15/42; B21J 15/142; B64F 5/10; B23P 19/04; B23P 19/10; B23P 2700/01; G05B 2219/39123; G05B 2219/39129
    See application file for complete search history.

(56) References Cited

U.S. PATENT DOCUMENTS

| | | | | |
|---|---|---|---|---|
| 8,467,071 B2* | 6/2013 | Steffey | ........... | G01B 11/002 356/614 |
| 9,007,601 B2* | 4/2015 | Steffey | ........... | G01B 11/002 356/614 |
| 9,146,094 B2* | 9/2015 | Steffey | ........... | G01B 11/002 |
| 9,364,926 B2* | 6/2016 | Batt | ........... | B23P 13/00 |
| 9,745,081 B2* | 8/2017 | Best | ........... | G01M 5/0016 |
| 2003/0207742 A1 | 11/2003 | Hazlehurst et al. | | |
| 2005/0153818 A1 | 7/2005 | Hazlehurst et al. | | |
| 2006/0176156 A1 | 8/2006 | Hazlehurst et al. | | |
| 2009/0140038 A1 | 6/2009 | Hazlehurst et al. | | |
| 2010/0283195 A1 | 11/2010 | Hazlehurst et al. | | |
| 2012/0236320 A1 | 9/2012 | Steffey et al. | | |
| 2013/0128284 A1 | 5/2013 | Steffey et al. | | |
| 2013/0185925 A1 | 7/2013 | Sarh et al. | | |
| 2013/0222791 A1 | 8/2013 | Steffey et al. | | |
| 2014/0185059 A1* | 7/2014 | Steffey | ........... | G01B 11/002 356/614 |
| 2014/0325813 A1 | 11/2014 | Batt | | |
| 2015/0013162 A1* | 1/2015 | Best | ........... | G01M 5/0016 29/897.2 |
| 2015/0092199 A1* | 4/2015 | Steffey | ........... | G01B 11/002 356/614 |
| 2016/0257428 A1 | 9/2016 | Batt | | |
| 2017/0327246 A1 | 11/2017 | Best et al. | | |

FOREIGN PATENT DOCUMENTS

| | | |
|---|---|---|
| EP | 3284559 A1 | 2/2018 |
| JP | 2001-300823 A | 10/2001 |
| JP | 2001-334426 A | 12/2001 |
| JP | 2009-101507 A | 5/2009 |
| JP | 2011-027670 A | 2/2011 |
| JP | 2013-154464 A | 8/2013 |
| JP | 5615416 B2 | 10/2014 |
| JP | 2015-42436 A | 3/2015 |
| KR | 100641585 B1 | 10/2006 |

OTHER PUBLICATIONS

Extended European Search Report in EP Application No. 16838951.8, dated Mar. 13, 2018. 10pp.
Office Action for Korean Application No. 2017-7034430 dated Apr. 24, 2019; 16pp.

* cited by examiner

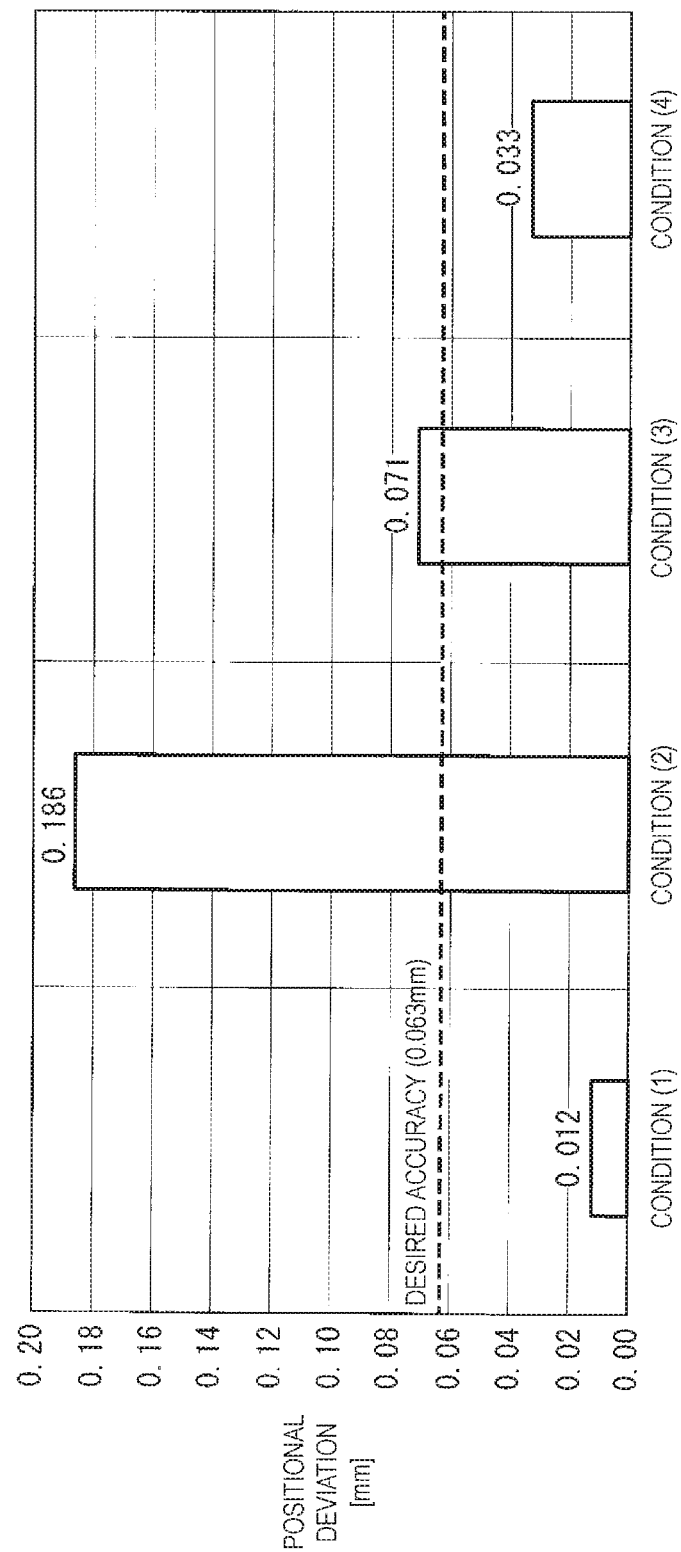

ASSEMBLY BODY MANUFACTURING DEVICE AND ASSEMBLY BODY MANUFACTURING METHOD

RELATED APPLICATIONS

The present application is a National phase of International Application No. PCT/JP2016/070602, filed Jul. 12, 2016, and claims priority based on Japanese Patent Application No. 2015-167986, filed Aug. 27, 2015.

TECHNICAL FIELD

The present invention relates to an assembly body manufacturing device and an assembly body manufacturing method.

BACKGROUND ART

In a typical manufacturing method, when a long member that has low rigidity and readily bends is mounted with another component, the long member is held by a fixing jig. Such a fixing jig has high rigidity and can thus prevent the long member from bending when the other component is mounted on the long member.

Patent Document 1 describes technology related to a manufacturing environment such as an assembly line in which an article such as a wing used in the structure of an aircraft with a complicated shape that is difficult to support is moved while being held in a correct posture.

CITATION LIST

Patent Literature

Patent Document 1: JP-A-2015-42436

SUMMARY OF INVENTION

Technical Problems

The long member is, for example, a stringer, which is a structure of an aircraft, and has a length of approximately 5 m to 15 m. Such stringers have different shapes depending on the installation positions, and various types of stringers may be installed in one aircraft. Thus, various types of fixing jigs for holding the stringers need to be prepared in mounting another component, such as clips, on the stringers.

Furthermore, plate-shaped skins joined to the stringers often have double-curved surfaces. When the skins have double-curved surfaces, the stringers have stereoscopic shapes with compound curves. That is, the stringers are not linear members that can be installed along one plane, and the fixing jigs for holding the stringers also have complex shapes.

Thus, replacing the fixing jigs with a plurality of robots that hold the long member has been considered. However, in fixing and holding a long member with hand parts of the robots, the inaccuracy of the operation of the hand parts of the robots or bending of the long member between the hand parts of the robots can lead to the portion of the long member where another component is joined and fixed being out of position from its intended position. Accordingly, there is a demand for a reduction in such positional deviations of a predetermined portion of the long member such as where another component is joined to the long member.

Note that the aforementioned problems are not limited to the stringers used for aircrafts and typically occur in holding a long member that has low rigidity and readily bends.

In the light of the foregoing, an object of the present invention is to provide an assembly body manufacturing device and an assembly body manufacturing method capable of reducing positional deviation of a predetermined portion of the long member without using a fixing jig in holding the long member.

Solution to Problems

An assembly body manufacturing device according to a first aspect of the present invention comprises:

a plurality of first gripping parts configured to grip a first member having a long shape;

a first drive part configured to move each of the plurality of first gripping parts and adjust a position of each of the plurality of first gripping parts gripping the first member;

a second gripping part configured to grip the first member, the second gripping part numbering less than the plurality of first gripping parts;

a second drive part configured to move the second gripping part and adjust a position of the second gripping part gripping the first member, the second drive part having a higher positioning accuracy in positioning adjustment than that of the plurality of ripping parts driven by the first drive part;

a storage unit configured to store an original shape of the first member; and a control unit configured to drive the first drive part and the second drive part and adjust positions of the plurality of first gripping parts and the second gripping part on the basis of the original shape of the first member stored in the storage unit such that a shape of the first member gripped by the plurality of first gripping parts and the second gripping part matches the original shape of the first member stored in the storage unit.

With this configuration, the plurality of first gripping parts grip the long first member, and the first drive part moves the plurality of first gripping parts gripping the first member and adjusts the position of each of the plurality of first gripping parts. Also, the first member having a long shape is gripped by the second gripping part numbering less than the plurality of first gripping parts, and the second gripping part is moved and adjusted in position by the second drive part. The positional adjustment of the second gripping part by the second drive part has a higher positioning accuracy than that of the plurality of first gripping parts driven by the first drive part. At this time, the control unit drives the first drive part and the second drive part to adjust the positions of the plurality of first gripping parts and the second gripping part on the basis of the original shape of the first member stored in the storage unit. In this way, the first member gripped by the plurality of first gripping parts and the second gripping part is held in a shape matching the original shape of the first member stored in the storage unit by adjusting the positions of the gripping parts. Also, by the first member being held by the plurality of first gripping parts as well as the second gripping part with a higher positioning accuracy, compared to a case in which the second gripping part is not provided, positional deviation of the predetermined portion of the first member can be reduced.

The first aspect preferably has a configuration wherein when positional adjustment is performed by the first drive part or the second drive part, the plurality of first gripping parts or the second gripping part allow the first member to move in a longitudinal direction while gripping the first member.

According to this configuration, the plurality of first gripping parts or the second gripping part are movable in the longitudinal direction of the first member while gripping the first member having a long shape and do not restrain movement or contraction/expansion in the longitudinal direction of the first member. As a result, even when positional adjustment of the plurality of first gripping parts or the second gripping part is performed or when the gripping position of the plurality of first gripping parts or the second gripping part is not appropriate, the first member having a long shape gripped by the plurality of first gripping parts or the second gripping part is resistant to tensile force and compressive force. Thus, deformation of the first member can be suppressed.

The first aspect preferably has a configuration wherein gripping positions of the plurality of first gripping parts or the second gripping part are preliminarily determined on the basis of an original shape of the first member and an amount of deformation of the first member when the plurality of first gripping parts or the second gripping part grip the first member.

With this configuration, the positions where the plurality of first gripping parts or the second gripping part grip the first member are preliminarily determined on the basis of the original shape of the first member and the amount of deformation of the first member when the plurality of first gripping parts or the second gripping part grip the first member, so that the plurality of first gripping parts or the second gripping part can grip the first member in such positions that the amount of deformation of the first member is minimized, for example.

The first aspect preferably further comprises a plate-like fixing part configured to fix a first end of the first member and restrain movement of the first member in the longitudinal direction.

With this configuration, the fixing part fixes the first end of the first member and restrains movement of the first member in the longitudinal direction, so that the first end of the first member can be set as a reference position for positioning.

The first aspect preferably has a configuration wherein the fixing part is disposed on either end side of the plurality of first gripping parts arranged in a row.

With this configuration, any of the fixing parts disposed on either side of the plurality of first gripping parts arranged in a row can be used, so that the fixing part can be selected depending on the shape and the like of the first member when the fixing part fixes the first end of the first member.

The aspects of the present invention described above preferably have a configuration wherein a reference point used for adjusting the positions of the plurality of first gripping parts or the second gripping part is determined on the basis of positional information derived from an installation position of the fixing part.

With this configuration, the reference point used for adjusting the positions of the plurality of first gripping parts or the second gripping part is determined precisely, so that the position of the first member can be adjusted precisely.

The first aspect preferably has a configuration wherein a reference coordinate used for adjusting the positions of the plurality of first gripping parts or the second gripping part is determined on the basis of positional information derived from installation positions of two of the fixing parts.

With this configuration, the reference coordinates used for adjusting the positions of the plurality of first gripping parts or the second gripping part is determined precisely, so that the position of the first member can be adjusted precisely.

The first aspect preferably further comprises a mounting robot configured to mount a second member on the first member.

With this configuration, the mounting robot mounts the second member on the first member gripped by the plurality of first gripping parts or the second gripping part.

The first aspect preferably has a configuration wherein at least one of the plurality of first gripping parts, the second gripping part, and the mounting robot is movable and relatively changes a position thereof.

With this configuration, at least one of the plurality of first gripping parts, the second gripping part, and the mounting robot moves to change a relative position thereof, so that the place where the mounting robot performs mounting can be different from, for example, the place where the plurality of first gripping parts take out the first member from a supplying position.

An assembly body manufacturing method according to a second aspect of the present invention comprises the steps of:

gripping a first member having a long shape with a plurality of first gripping parts;

moving each of the plurality of first gripping parts with a first drive part to adjust positions of the plurality of first gripping parts gripping the first member;

gripping the first member with a second gripping part numbering less than the plurality of first gripping parts;

moving the second gripping part with the second drive part having a higher positioning accuracy in positioning adjustment than that of the plurality of first gripping parts driven by the first drive part to adjust a position of the second gripping part gripping the first member;

driving the first drive part and the second drive part to adjust the positions of the gripping parts with a control unit on the basis of an original shape of the first member stored in a storage unit such that a shape of the first member gripped by the plurality of first gripping parts and the second gripping part matches the original shape; and mounting a second member on the first member.

The second aspect preferably further comprising the steps of:

fixing a first end of the first member with a fixing part and restraining movement of the first member in a longitudinal direction; and moving the first member in the longitudinal direction by the plurality of first gripping parts with the plurality of first gripping parts gripping the first member when positional adjustment is performed by the first drive part.

The second aspect preferably further comprising the steps of:

releasing the first member from being gripped by the plurality of first gripping parts after the first end of the first member is restrained by the fixing part, and then again gripping the first member with the plurality of first gripping parts.

Advantageous Effects of Invention

According to the present invention, positional deviations of a predetermined portion of the long member can be reduced without using a fixing jig in holding the long member.

BRIEF DESCRIPTION OF DRAWINGS

FIG. 11 is a graph illustrating positional deviations in the mounting position of the stringer in the longitudinal direction for each condition.

DESCRIPTION OF EMBODIMENTS

Figure 1:
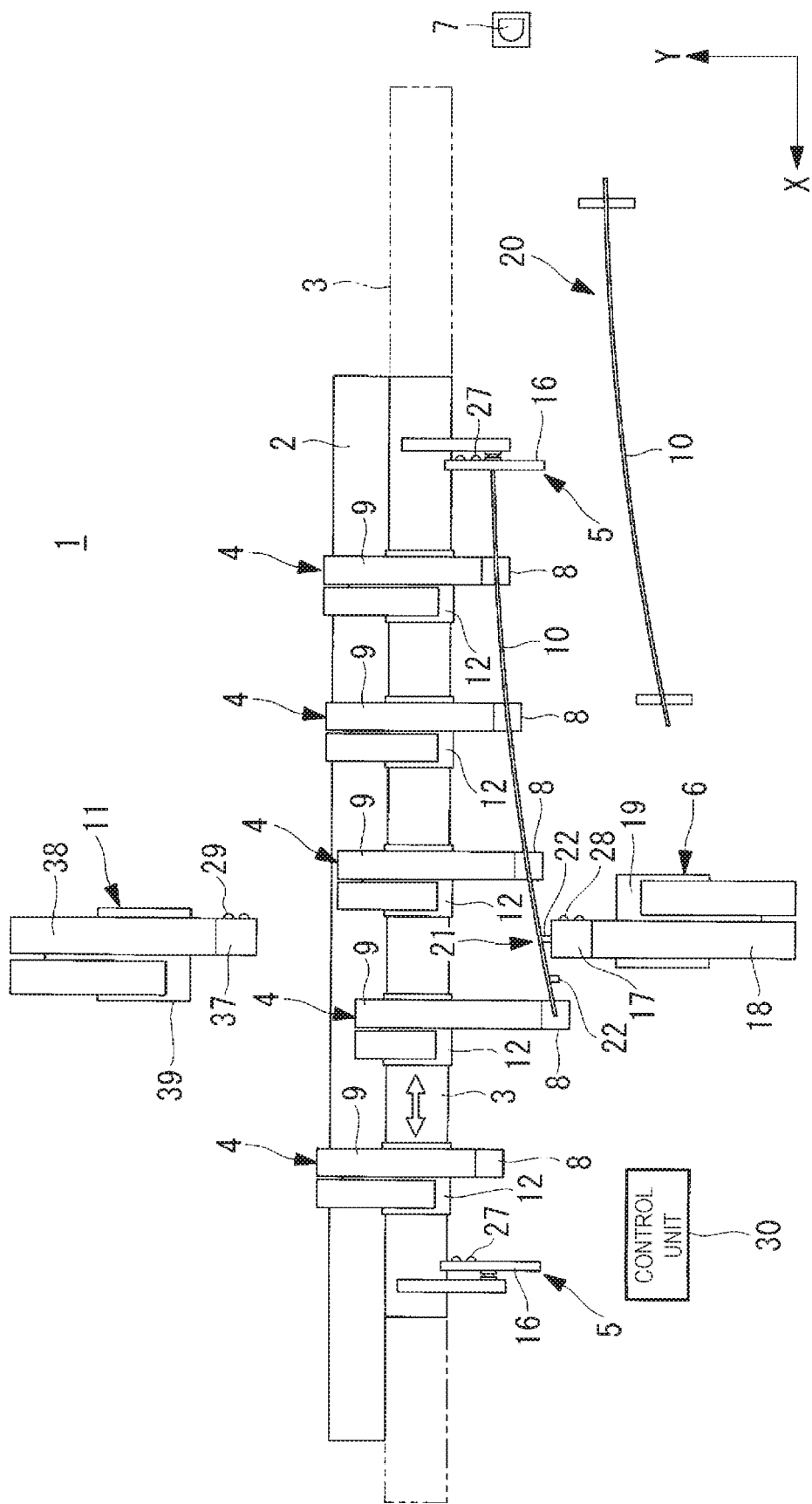
FIG. 1 is a plan view illustrating a long member assembling device according to an embodiment of the present invention.

A long member assembling device according to embodiments of the present invention will be described below with reference to the drawings.

A configuration of the long member assembling device according to the present embodiment will now be described with reference to FIG. 1.

The long member assembling device 1 includes a conveyor 2, a table 3, a plurality of supporting robots 4, touch plates 5, a mounting robot 6, a laser tracker 7, and a gripping robot 11. The long member assembling device 1 is an assembly body manufacturing device that manufactures an assembly body, the long member assembling device 1 having a configuration in which another component 22, which is a second member, is mounted on a long member 10, which is a first member.

The long member assembling device 1 takes out the long member 10 from a supplying position 20 and conveys the long member 10 to a mounting position 21. Then, the other component 22 is mounted on the long member 10 in the mounting position 21. Before the component 22 is mounted, the long member 10 is temporarily placed in the supplying position 20, and the mounting robot 6 and the gripping robot 11 are placed in the vicinity of the mounting position 21 fixed on the floor.

The long member 10 is, for example, a stringer which is a structural member of an aircraft. The stringer has a length of approximately 5 m to 15 m and has a stereoscopic shape with a compound curve, for example. Another component 22 called clip, for example, is mounted on the stringer. Herein, an object having a configuration in which the clip is mounted on the stringer corresponds to the assembly body. The clip is a component used in forming a long frame to which a plurality of the stringers are connected. When the frame is assembled together with the stringers, the clips mounted in precise positions in the longitudinal direction of the stringers enable the frame to be formed with the stringers connected thereto while the frame does not bend.

A generally used conveyor can be used as the conveyor 2. The table 3, which will be described after, is placed on the conveyor 2. The conveyor 2 moves the table 3 from a first end side to a second end side and from the second end side to the first end side. The first end side of the conveyor 2 is located in the vicinity of the supplying position 20 for the long member 10, and the conveyor 2 moves the table 3 from the vicinity of the supplying position 20 to the vicinity of the mounting robot 6.

When a plurality of the components 22 are mounted on the long member 10 in the longitudinal direction, the mounting robot 6 mounts one of the components 22 in a predetermined region of the long member 10, and then the conveyor 2 conveys the table 3 on which the supporting robots 4 gripping the long member 10 are installed. This operation allows the long member 10 to be conveyed while the supporting robots 4 grip the long member 10 while maintaining a component shape of the long member 10 in a predetermined held shape, and allows the mounting robot 6 to mount a component 22 in a next predetermined region. After the other component 22 is mounted in the predetermined region, the conveyor 2 conveys the table 3, and the mounting robot 6 mounts a component 22 in a further next predetermined region of the long member 10. This operation is repeated to mount the components 22 on the entirety of the long member 10 in the longitudinal direction. A single component 22 may be mounted in a single predetermined region, or a plurality of the components 22 may be mounted in the longitudinal direction of the predetermined region.

The supporting robots 4 and the touch plates 5 are installed in a row on the table 3. This configuration enables the supporting robots 4 and the touch plates 5 to integrally move on the conveyor 2. The supporting robots 4 are placed in a row on the table 3. The touch plates 5 are placed on both ends of the table 3, that is, both sides of the supporting robots 4. The number of the supporting robots 4 placed on the table 3 and the distance between the supporting robots 4 are preliminarily determined depending on the long member 10 to be assembled. The number of the supporting robots 4 to be operated for gripping the long member 10 is determined on the basis of the length of the long member 10 to be actually gripped. FIG. 1 illustrates a state in which four out of five supporting robots 4 are gripping the long member 10.

Figure 2:
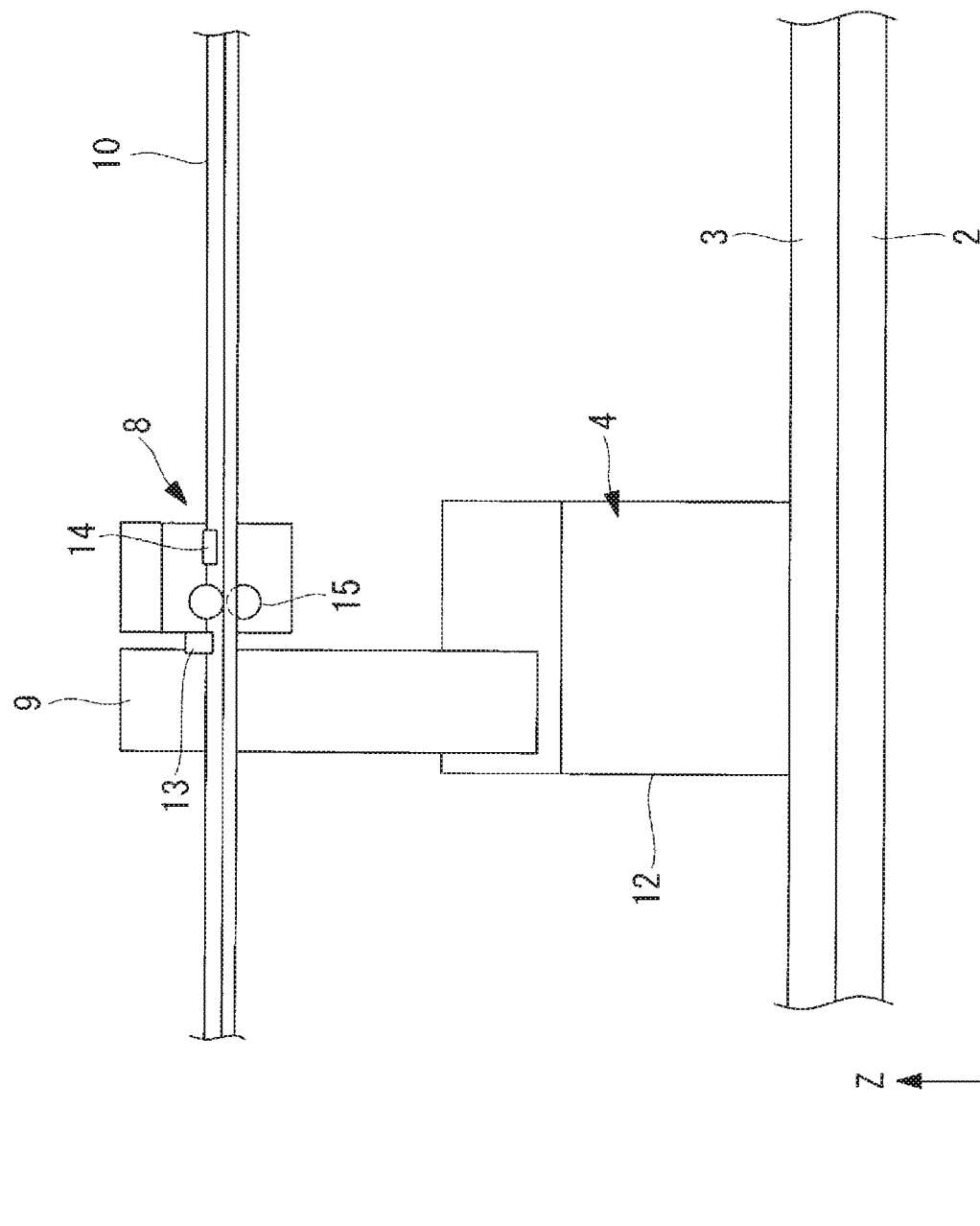
FIG. 2 is a front view illustrating a gripping robot of the long member assembling device according to the embodiment of the present invention.

As illustrated in FIGS. 1 and 2, the supporting robots 4 each include a hand part 8 that grips the long member 10, an arm part 9 provided with the hand part 8 at the leading end thereof, and a trunk part 12 supporting the arm part 9. The hand part 8 is exemplified as a first gripping part, and the arm part 9 and the trunk part 12 are exemplified as a first drive part.

The hand part 8 includes a stopper 13 that grips the long member 10 to prevent the long member 10 from falling off, an A reference plane roller part 14 that determines a Y coordinate of the long member 10 so that the hand part 8 can move the long member 10 in an X direction when the stopper 13 does not grip the long member 10, and a B reference plane roller part 15 that determines a Z coordinate. A detailed configuration of the hand part 8 will be described below.

The arm part 9 and the trunk part 12 move the hand part 8 so that the hand part 8 can appropriately support the long member 10. A generally used configuration of robots can be applied to the arm part 9 and the trunk part 12. The supporting robot 4 detects the position of the hand part 8 and moves the hand part 8 on the basis of a reference position the supporting robot 4 itself has.

The touch plates 5 each include a flat plate part 16, and a first end of the long member 10 comes into contact with a surface of the flat plate part 16.

The touch plate 5 restrains the first end of the long member 10. This configuration allows a position of the first end of the long member 10 coming into contact with the touch plate 5 to be set as a reference position for positioning the other component 22 when the other component 22 is mounted. A detailed configuration of the touch plate 5 will be described below.

The touch plate 5 is provided with reflectors 27 that reflect laser beams from the laser tracker 7. The laser tracker 7 detects positional information on the reflectors 27 disposed on the touch plate 5 on the basis of the laser beams radiated from the laser tracker 7 and reflected by the reflectors 27. The positional information on the reflectors 27 enables detection of the position and inclination of the touch plate 5 and determination of a reference coordinate.

One touch plate 5 is placed on either end of the table 3, that is, on each side of the plurality of supporting robots 4. Only one of the two touch plates 5 is used to bring the long member 10 into contact with the touch plate 5. The touch plate 5 is selected depending on the shape of the long member 10. FIG. 1 is a view illustrating a state in which the long member 10 is in contact with the touch plate 5 located closer to the laser tracker 7.

The mounting robot 6 includes a hand part 17 that grips the other component 22, an arm part 18 provided with the hand part 17 at the leading end thereof, and a trunk part 19 supporting the arm part 18.

The arm part 18 and the trunk part 19 move the other component 22 gripped by the hand part 17 to the mounting position 21 of the long member 10. A generally used configuration of robots can be applied to the arm part 18 and the trunk part 19. The mounting robot 6 detects the position of the hand part 17 and moves the hand part 17 on the basis of a reference position the mounting robot 6 itself has and positional information on reflectors 28 disposed on the hand part 17 of the mounting robot 6.

The hand part 17 of the mounting robot 6 is provided with the reflectors 28 that reflects laser beams from the laser tracker 7. The laser tracker 7 detects the positional information on the reflectors 28 disposed on the hand part 17 on the basis of the laser beams radiated from the laser tracker 7 and reflected by the reflectors 28. The hand part 17 can be controlled on the basis of the positional information on the reflectors 28 detected by the laser tracker 7, and the precision of positional control of the hand part 17 of the mounting robot 6 can be enhanced to levels beyond that of a configuration in which reflectors 28 are not provided.

At least three reflectors 28 are installed on the hand part 17, and the position of each of the reflectors 28 is detected by the laser tracker 7. This configuration enables correct calculation of the position and inclination of the hand part 17.

The mounting robot 6, the gripping robot 11, and another robot may possess all the functions of clamping the component 22 to the long member 10, perforating, and riveting.

The gripping robot 11 include a hand part 37 that grips the long member 10 and the other component 22, an arm part 38 provided with the hand part 37 at the leading end thereof, and a trunk part 39 supporting the arm part 38.

The hand part 37 is configured to move the long member 10 in the X direction and position the Y coordinate and Z coordinate of the long member 10.

The arm part 38 and the trunk part 39 move the hand part 37 so that the hand part 37 can appropriately support the long member 10. A generally used configuration of robots can be applied to the arm part 38 and the trunk part 39. The gripping robot 11 detects the position of the hand part 37 and moves the hand part 37 on the basis of a reference position the gripping robot 11 itself has and positional information on reflectors 29 disposed on the hand part 37 of the gripping robot 11.

The hand part 37 of the gripping robot 11 is provided with the reflectors 29 that reflect laser beams from the laser tracker 7. The laser tracker 7 detects the positional information on the reflectors 29 disposed on the hand part 37 on the basis of the laser beams radiated from the laser tracker 7 and reflected by the reflectors 29. The hand part 37 can be controlled on the basis of the positional information on the reflectors 29 detected by the laser tracker 7, and the precision of positional control of the hand part 37 of the gripping robot 11 can be enhanced to levels beyond that of a configuration in which reflectors 29 are not provided. Thus, in the present embodiment, the gripping robot 11 produces less positional errors in positioning compared to the supporting robot 4.

At least three reflectors 29 are installed on the hand part 37, and the position of each of the reflectors 29 is detected by the laser tracker 7. This configuration enables correct calculation of the position and inclination of the hand part 37.

After the gripping robot 11 suitably supports the long member 10, the mounting robot 6, the gripping robot 11, and another robot may perform clamping of the component 22 to the long member 10, perforating, and riveting.

The laser tracker 7 scans the reflectors 27, 28, 29 with the laser beams to detect the positions of the reflectors 27, 28, 29. The laser tracker 7 is installed in a position separate from the conveyor 2, the supporting robots 4, the mounting robot 6, and the gripping robot 11 in a fixed manner.

Figure 3:
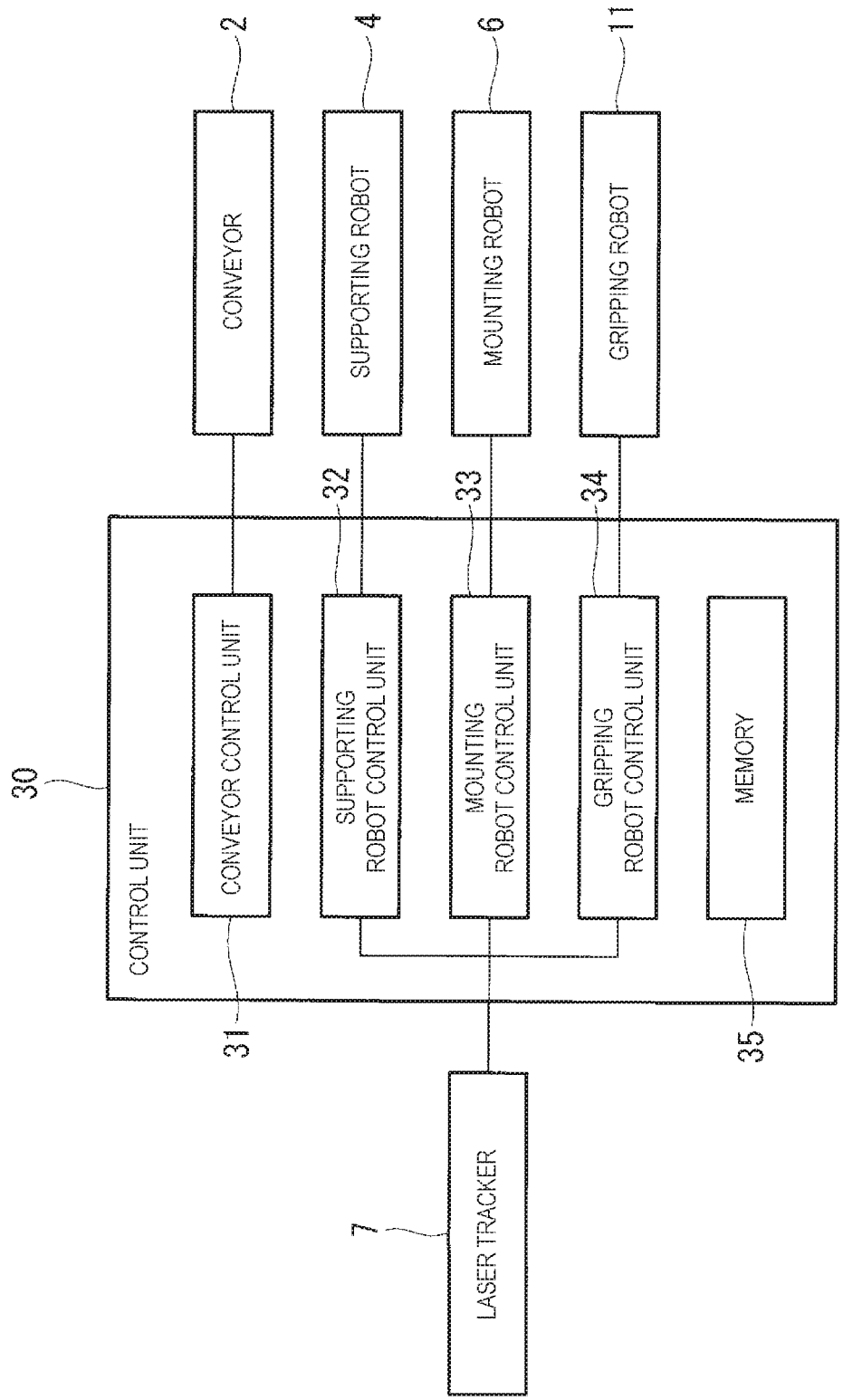
FIG. 3 is a block diagram illustrating a control unit of the long member assembling device according to the embodiment of the present invention.

As illustrated in FIG. 3, a control unit 30 that controls the long member assembling device 1 includes, for example, a conveyor control unit 31, a supporting robot control unit 32, a mounting robot control unit 33, and a gripping robot control unit 34. The control unit 30 is, for example, a computer executed with a program.

The conveyor control unit 31 adjusts the position of the conveyor 2 so that the predetermined region of the long member 10 moves to the mounting position 21. The conveyor control unit 31 actuates the conveyor 2 to move the table 3 to a predetermined position on the basis of the region of the long member 10 where the component 22 is mounted and the mounting position 21.

The supporting robot control unit 32 detects the position of the hand part 8 and causes the hand part 8 to move on the basis of the reference position the supporting robot 4 itself has and the reference coordinate determined with the positional information, detected by the laser tracker 7, on the reflectors 27 disposed on the touch plate 5. The supporting robot control unit 32 brings an end portion of the long member 10 into contact with the touch plate 5. The supporting robot control unit 32 also causes the hand parts 8 of the supporting robots 4 to move corresponding to the original shape of the long member 10 stored in a memory 35.

The mounting robot control unit 33 detects the positions of the hand parts 17 and causes the hand parts 17 to move on the basis of the reference positions the mounting robot 6 itself has, the positions of the reflectors 28 provided on the hand part 17 of the mounting robot 6, the reference coordinate determined with the positional information, detected by the laser tracker 7, on the reflectors 27 disposed on the touch plate 5, and the positional information on the reflectors 28 disposed on the hand part 17. The mounting robot control unit 33 operates the hand parts 17 to mount the other component 22 on the long member 10. Specifically, the mounting robot control unit 33 causes the hand parts 17 to clamp the component 22 to the long member 10, and perforate and rivet the long member 10 and the component 22. However, this function may be performed by the gripping robot control unit 34 described below or the control unit of another robot.

The gripping robot control unit 34 detects the positions of the hand parts 37 and causes the hand parts 37 to move on the basis of the reference positions the gripping robot 11 itself has, the positions of the reflectors 29 provided on the hand part 37 of the gripping robot 11, the reference coordinate determined with the positional information, detected by the laser tracker 7, on the reflectors 27 disposed on the touch plate 5, and the positional information on the reflectors 29 disposed on the hand part 37.

Figure 4:
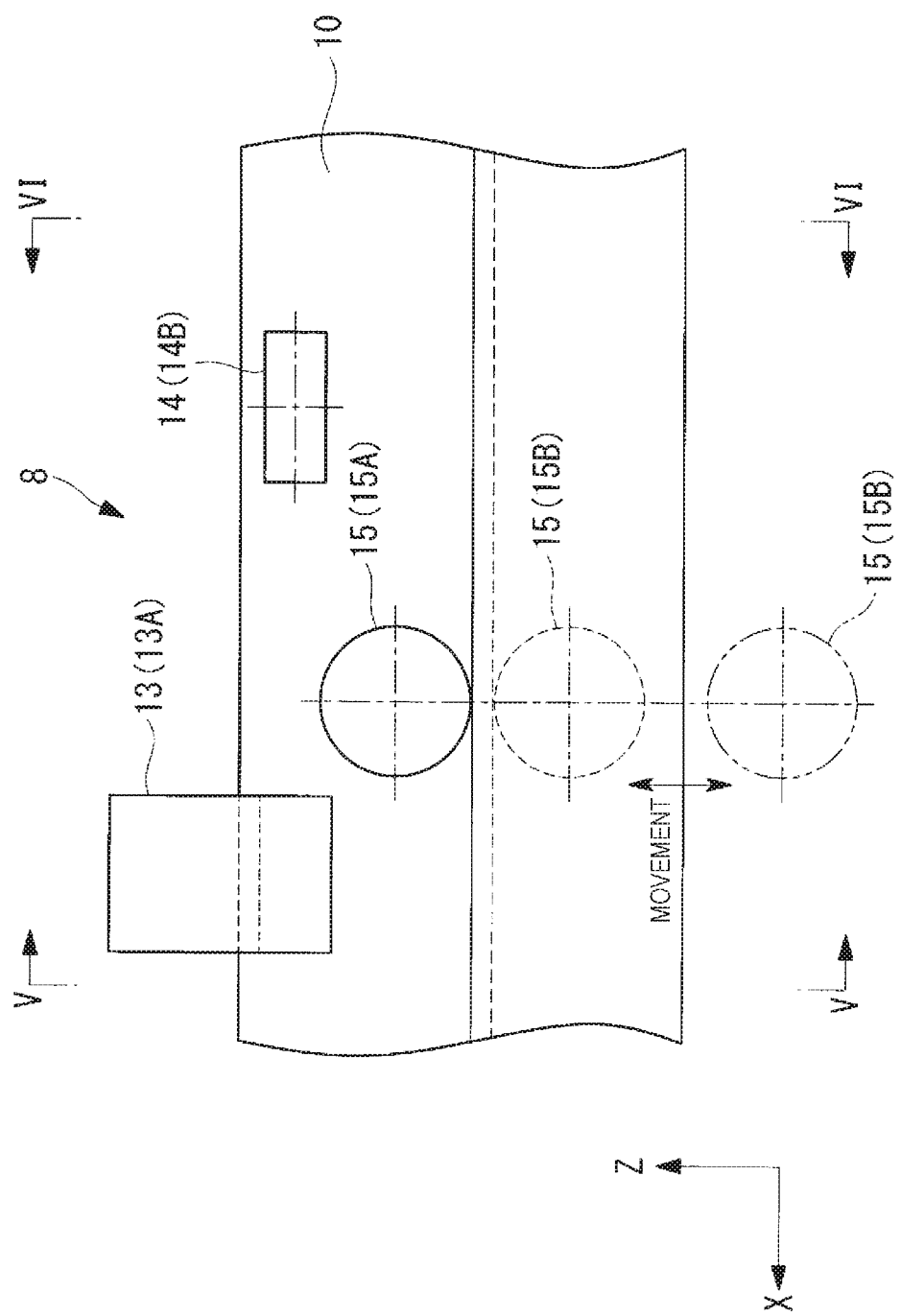
FIG. 4 is a front view illustrating a hand part of the gripping robot of the long member assembling device according to the embodiment of the present invention.
Figure 5:
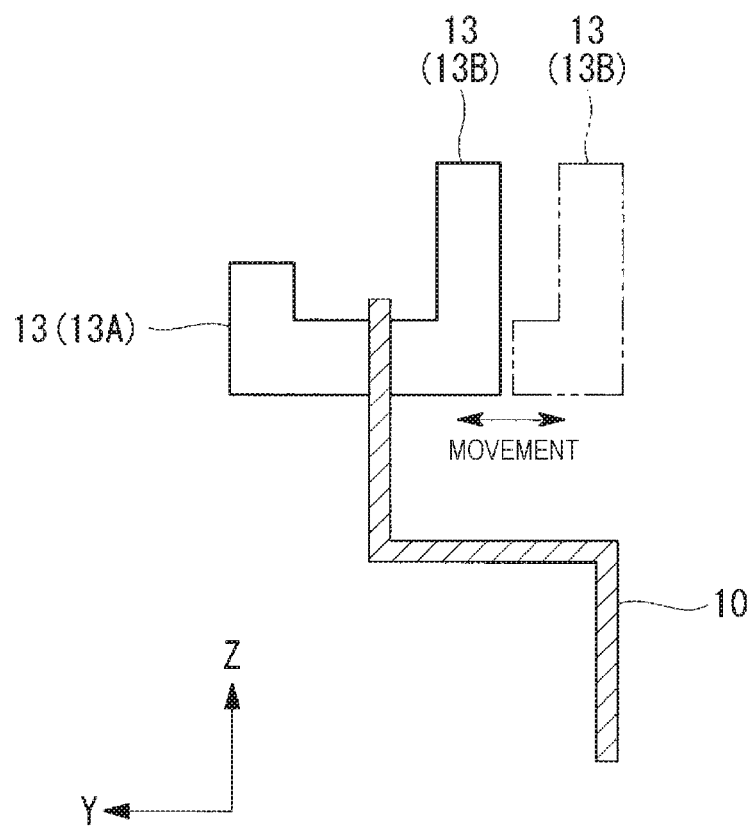
FIG. 5 is a cross-sectional view taken along line V-V in FIG. 4.
Figure 6:
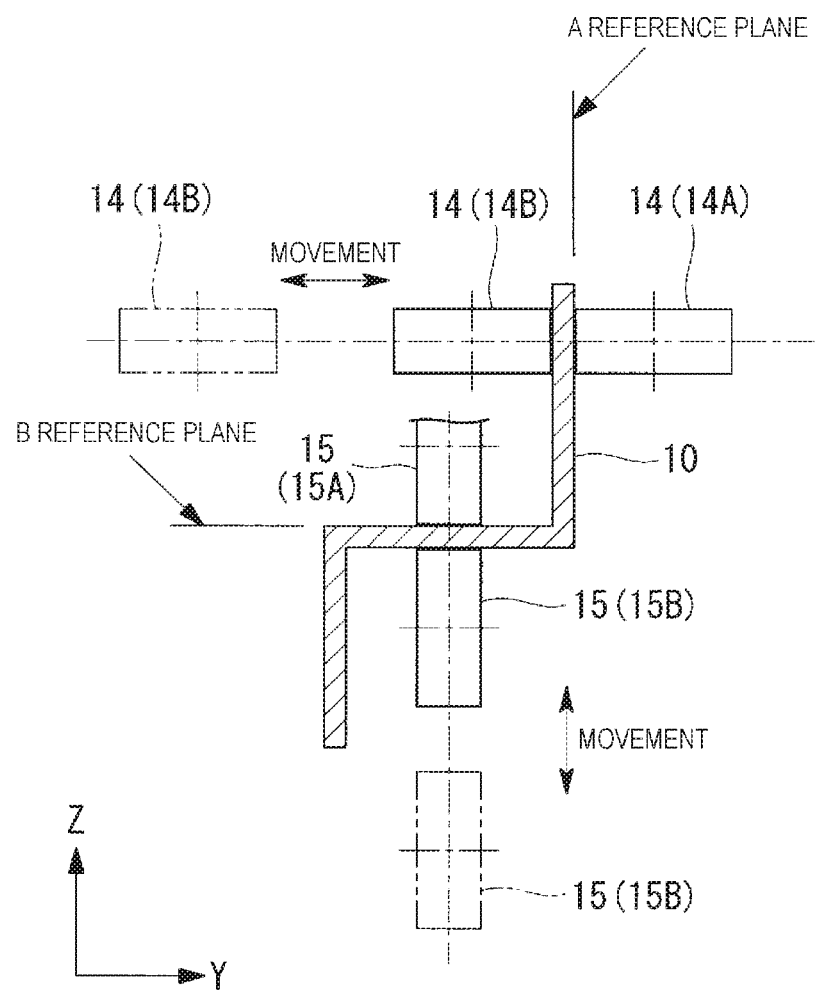
FIG. 6 is a cross-sectional view taken along line VI-VI in FIG. 4.

A configuration of the hand part 8 of the supporting robot 4 will now be described with reference to FIGS. 4 to 6.

The hand part 8 of the supporting robot 4 includes the stopper 13, the A reference plane roller part 14, and the B reference plane roller part 15. Note that FIGS. 4 to 6 illustrate a case in which the horizontal cross section of the long member 10 has a so-called Z shape; however, the present invention can also be applied to a long member 10 having a different cross-sectional shape by changing the stoppers 13 and the arrangement positions of the gripping parts.

The stopper 13 sandwiches a flat plate portion of the long member 10 from both sides. The stopper 13 is used in moving the long member 10 from the supplying position 20 to the conveyor 2 and prevents the long member 10 from falling off from the hand part 8 of the supporting robot 4. The long member 10 comes into contact with the touch plate 5 with the long member 10 being gripped using the stopper 13. At this time, only one of the stoppers 13 of the supporting robot 4 is required to sandwich the long member 10.

After the long member 10 comes into contact with the touch plate 5, the stopper 13 releases gripping of the long member 10.

The stopper 13 is composed of, for example, a fixed component 13A and a movable component 13B. The movable component 13B moves closer to and away from the fixed component 13A with an actuator (not illustrated). When the movable component 13B moves closer to the fixed component 13A, the flat plate portion of the long member 10 is sandwiched. In contrast, when the movable component 13B moves away from the fixed component 13A, sandwiching is released.

The A reference plane roller part 14 positions an A reference plane on the long member 10. The A reference plane roller part 14 adjusts the position of the Y coordinate of the gripped portion.

The A reference plane roller part 14 is composed of a fixed roller 14A and a movable roller 14B. The movable roller 14B moves parallel to the Y axis in the XY plane and moves closer to and away from the fixed roller 14A with an actuator (not illustrated). When the movable roller 14B moves closer to the fixed roller 14A, the flat plate portion of the long member 10 is sandwiched. In contrast, when the movable roller 14B moves away from the fixed roller 14A, sandwiching is released.

The rotation axes of the fixed roller 14A and the movable roller 14B extend perpendicular to the longitudinal direction of the long member 10 and parallel to the A reference plane. This configuration prevents the A reference plane roller part 14 from restraining movement of the long member 10 in the longitudinal direction and allows the long member 10 to move in the longitudinal direction when the fixed roller 14A and the movable roller 14B sandwich the long member 10.

A flat plate surface of the long member 10 coming into contact with the outer peripheral surface of the fixed roller 14A when the fixed roller 14A and the movable roller 14B sandwich the long member 10 is the A reference plane. Thus, by adjusting the position of the outer peripheral surface of the fixed roller 14A coming into contact with the A reference plane using the supporting robot 4, the A reference plane is positioned on the long member 10.

The B reference plane roller part 15 positions a B reference plane on the long member 10. The B reference plane roller part 15 adjusts the position of the Z coordinate of the gripped portion.

Similar to the A reference plane roller part 14, the B reference plane roller part 15 is composed of a fixed roller 15A and a movable roller 15B. The movable roller 15B moves parallel to the Z axis in the XZ plane with an actuator (not illustrated). The rotation axes of the fixed roller 15A and the movable roller 15B extend perpendicular to the longitudinal direction of the long member 10 and parallel to the B reference plane.

A flat plate surface of the long member 10 coming into contact with the outer peripheral surface of the fixed roller 15A when the fixed roller 15A and the movable roller 15B sandwich the long member 10 is the B reference plane. Thus, by adjusting the position of the outer peripheral surface of the fixed roller 15A coming into contact with the B reference plane using the supporting robot 4, the B reference plane is positioned on the long member 10.

Figure 7:
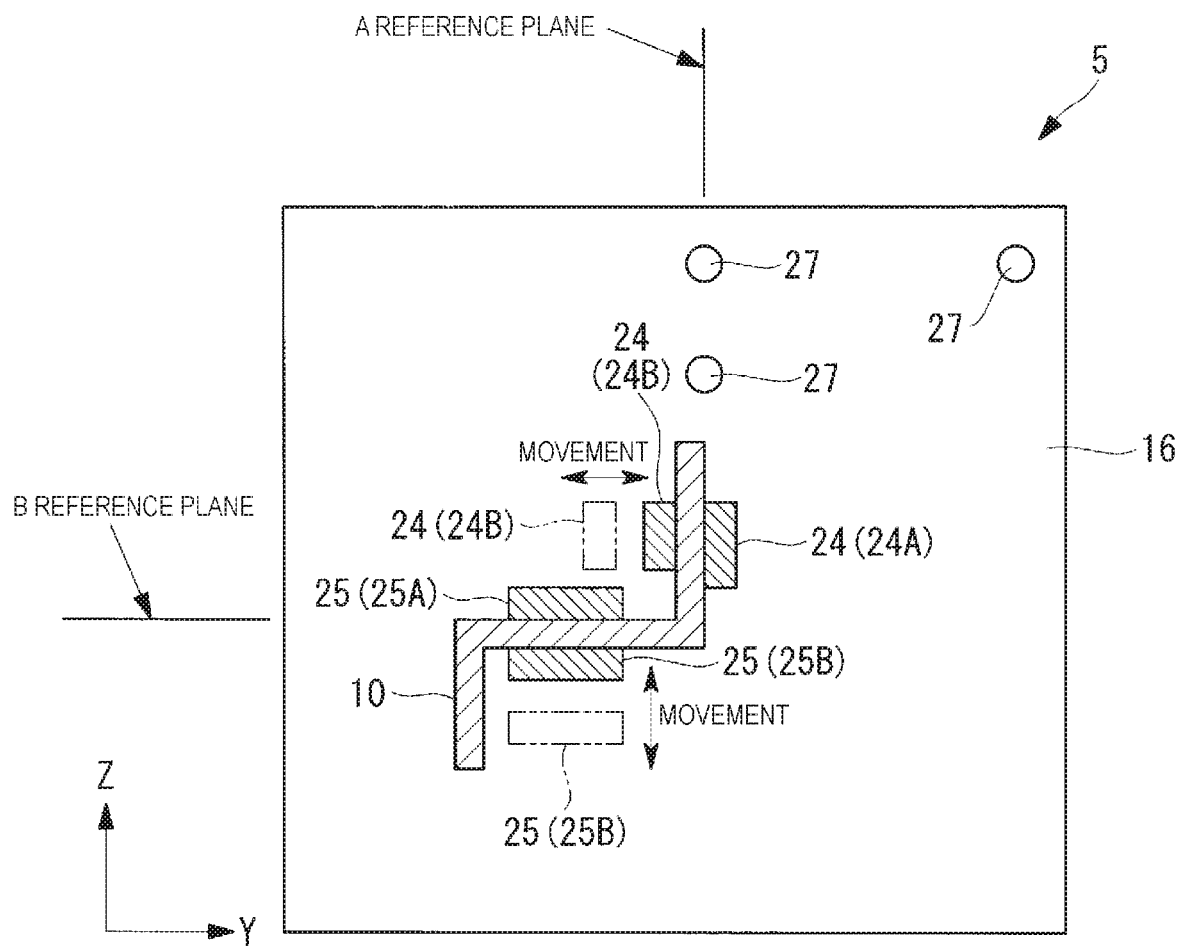
FIG. 7 is a cross-sectional view taken along line VII-VII in FIG. 8.
Figure 8:
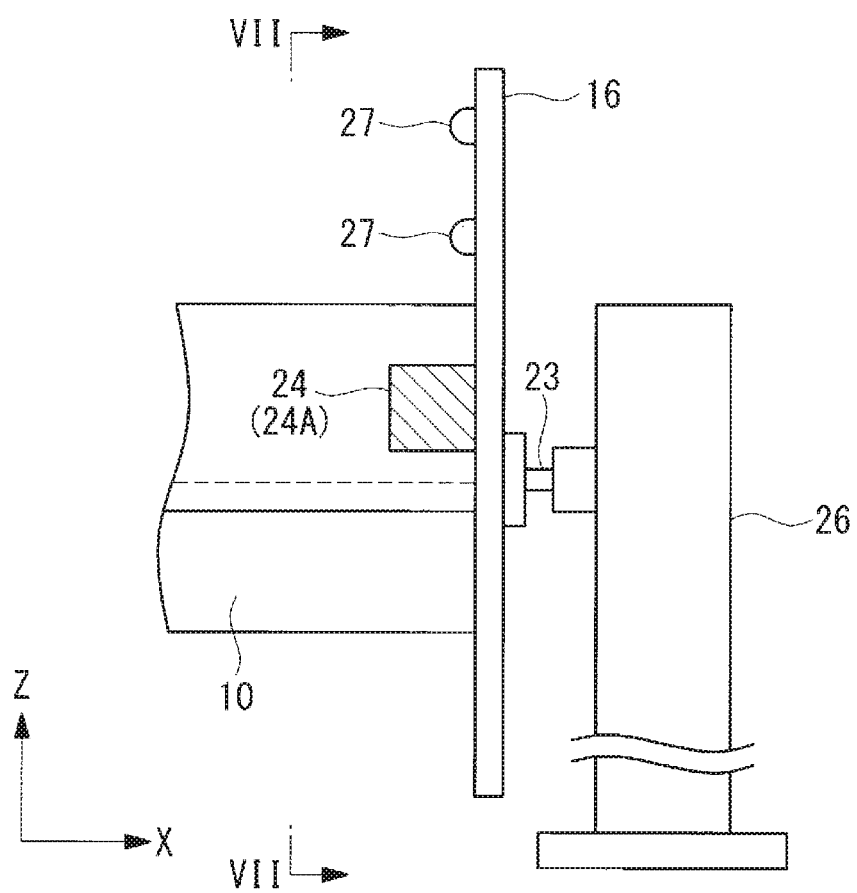
FIG. 8 is a front view illustrating a touch plate of the long member assembling device according to the embodiment of the present invention.

A configuration of the touch plate 5 will now be described with reference to FIGS. 7 and 8.

When the end surface (YZ surface) of the first end portion of the long member 10 completely comes into surface contact with a flat surface (YZ surface) of the flat plate part 16 of the touch plate 5 and is restrained in the Y direction and the Z direction, the position of the first end portion of the long member 10 coining into contact with the touch plate 5 and the extending direction of the long member 10 can be identified.

The touch plate 5 is provided with the flat plate part 16, an A reference plane jig 24 and a B reference plane jig 25 disposed on the flat plate part 16, a floating unit 23, and the reflectors 27. Note that FIGS. 7 and 8 illustrate a case in which the horizontal cross section of the long member 10 has a so-called Z shape; however, the present invention can also be applied to a long member 10 having a different cross-sectional shape by changing the arrangement position of the A reference plane jig 24 and the B reference plane jig 25. FIG. 8 illustrates a state in which the long member 10 comes into contact with the touch plate 5 disposed on a side different from that in FIG. 1.

The A reference plane jig 24 restrains the long member 10 such that the A reference plane on the long member 10 is in a reference position. The A reference plane jig 24 restrains movement of the long member 10 in the Y direction.

The A reference plane jig 24 is composed of, for example, a fixed component 24A and a movable component 24B. The fixed component 24A is installed protruding on one surface side of the flat plate part 16. The movable component 24B moves closer to and away from the fixed component 24A with an actuator (not illustrated). When the movable component 24B moves closer to the fixed component 24A, the flat plate portion of the long member 10 is sandwiched. By contrast, when the movable component 24B moves away from the fixed component 24A, sandwiching is released.

The surface of the fixed component 24A that comes into contact with the long member 10 is perpendicular to the flat surface of the flat plate part 16. This configuration ensures that the end surface of the long member 10 is pressed against the touch plate 5 and enables correct setting of the extending direction of the long member 10 when the A reference plane jig 24 restrains movement of the long member 10 in the Y direction.

The flat plate surface of the long member 10 that comes into contact with the fixed component 24A when the fixed component 24A and the movable component 24B sandwich the long member 10 is the A reference plane.

The B reference plane jig 25 restrains the long member 10 such that the B reference plane on the long member 10 is in a reference position. The B reference plane jig 25 restrains movement of the long member 10 in the Z direction.

The B reference plane jig 25 is composed of, for example, a fixed component 25A and a movable component 25B. The surface of the fixed component 25A that comes into contact with the long member 10 is perpendicular to the flat surface of the flat plate part 16. This configuration ensures that the end surface of the long member 10 is pressed against the touch plate 5 and enables correct setting of the extending direction of the long member 10 when the B reference plane jig 25 restrains movement of the long member 10 in the Z direction.

The flat plate surface of the long member 10 that comes into contact with the fixed component 25A when the fixed component 25A and the movable component 25B sandwich the long member 10 is the B reference plane.

The floating unit 23 is installed between a support 26 and the flat plate part 16. The floating unit 23 allows the flat plate part 16 to move in the X direction and incline with respect to the X direction. This configuration enables the end surface of the long member 10 to appropriately come into surface contact with the surface of the flat plate part 16 of the touch plate 5.

The support 26 is installed in a fixed manner on the table 3.

At least three reflectors 27 are installed on the flat plate part 16, and the position of each of the reflectors 27 is detected by the laser tracker 7. This configuration enables correct calculation of the position and inclination of the flat plate part 16.

Figure 9:
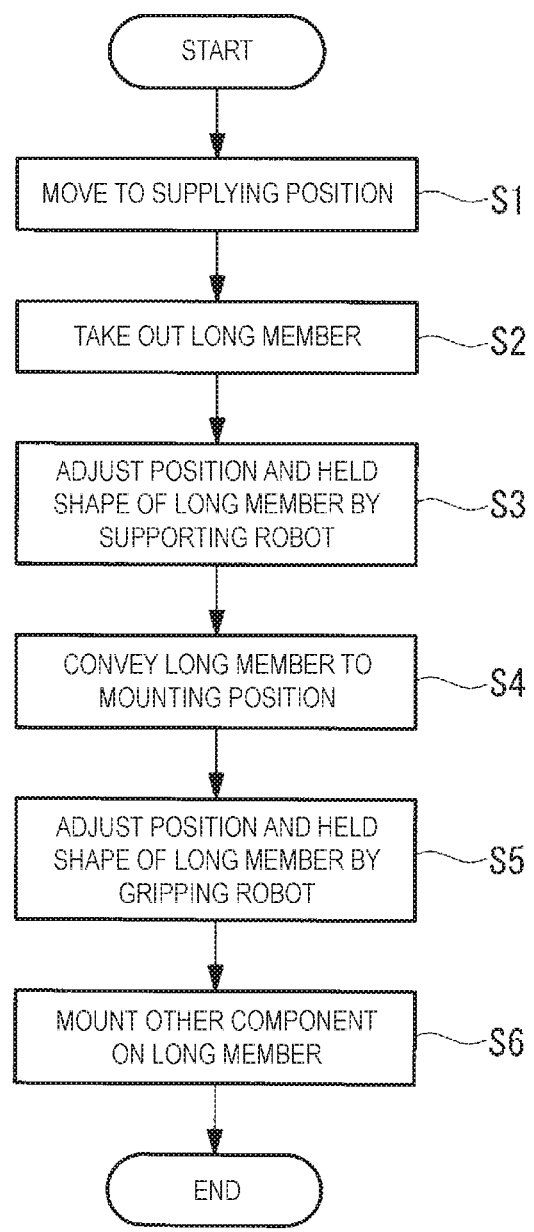
FIG. 9 is a flowchart illustrating operations of the long member assembling device according to the embodiment of the present invention.

As illustrated in FIG. 9, operations of the long member assembling device according to the present embodiment will now be described.

Before the other component 22 is mounted on the long member 10, the long member 10 to be assembled is temporarily placed on a rack or the like in the supplying position 20. The table 3 on which the supporting robots 4 are placed moves on the conveyor 2 so that the supporting robots 4 approach the long member 10 temporarily placed in the supplying position 20 (step S1). At this time, the number of the supporting robots 4 for gripping the long member 10 and the touch plate 5 with which the long member 10 comes into contact have been determined. Note that the positions of the supporting robots 4 on the table 3 have been already adjusted.

Next, the hand parts 8 of the supporting robots 4 grip the long member 10 and move the long member 10 from the supplying position 20 to the conveyor 2 to take out the long member 10 from the supplying position 20 (step S2). At this time, the hand parts 8 of the supporting robots 4 preferably grip the long member 10 in such positions that the long member 10 does not bend, that is, in such positions that tensile force or compressive force is not applied to the long member 10.

The hand parts 8 of the supporting robots 4 are moved and the position and held shape of the long member 10 is adjusted by the supporting robots 4 corresponding to the original shape of the long member 10 stored in a memory 35 (step S3). At this time, the first end portion of the long member 10 is restrained by the touch plate 5. This operation enables correct adjustment of the position and held shape of the long member 10 with reference to the first end portion of the long member 10.

After the position and the like of the long member 10 are adjusted, the conveyor 2 conveys the table 3 with the supporting robots 4 gripping the long member 10. This operation allows the supporting robots 4 on the table 3 placed on the conveyor 2 to be conveyed and the long member 10 to be moved to the mounting position 21 where the mounting robot 6 can mount the other component 22 on the long member 10 (step S4).

Before mounting the other component 22, the hand part 37 of the gripping robot 11 is moved and the position and held shape of the long member 10 is adjusted by the gripping robot 11 corresponding to the original shape of the long member 10 stored in a memory 35 (step S5). Major operations of the gripping robot 11 include positional control on the basis of the reference position of the gripping robot 11 itself instead of positional control by the laser tracker 7, and positional control using the laser tracker 7 for final fine adjustment. By the adjusting being performed by the gripping robot 11, which has higher positioning accuracy than the plurality of supporting robots 4, instead of the plurality of supporting robots 4, the positioning accuracy of the mounting position 21 where the other component 22 is mounted is enhanced.

Then, the mounting robot 6 and the gripping robot 11 mount the other component 22 on the long member 10 (step S6). Major operations of the mounting robot 6 include positional control on the basis of the reference position of the mounting robot 6 itself instead of positional control by the laser tracker 7, and positional control using the laser tracker 7 for final fine adjustment. Since the supporting robots 4 and the gripping robot 11 have adjusted the position and held shape of the long member 10 correctly as described above, the mounting robot 6 can mount the other component 22 in a desired precise position. The supporting robots 4 may adjust the position and held shape of the long member 10 again before the mounting robots 6 mount the other component 22 on the long member 10.

After the supporting robots 4 adjust the position and the like of the long member 10 and the long member 10 is conveyed and before the mounting robots 6 mount the other component 22, it may be checked whether the long member 10 is held in the original shape or a precise position. For example, it is checked whether the long member 10 is held in the original shape by measuring the mounting position 21 of the other component 22 on the long member 10 and measuring the total length of the long member 10.

Figure 10:
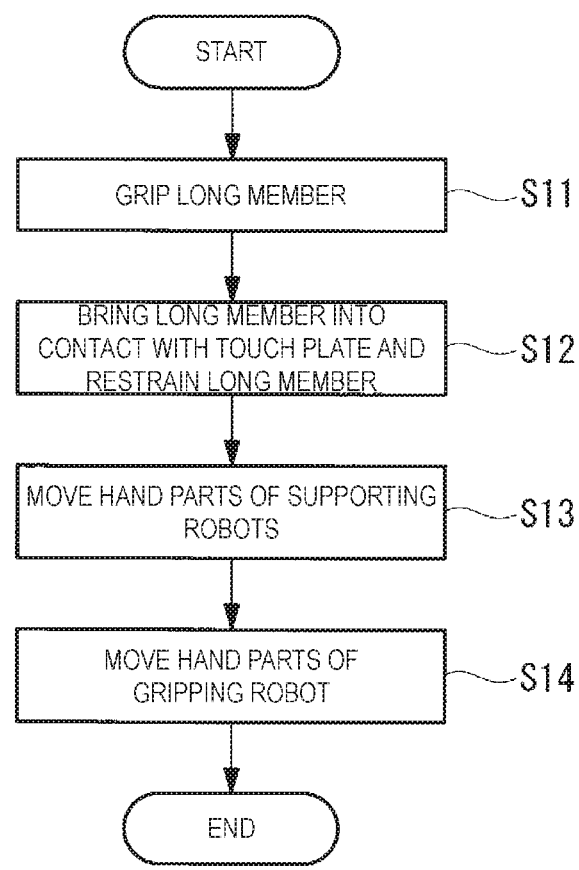
FIG. 10 is a flowchart illustrating operations of the gripping robots of the long member assembling device according to the embodiment of the present invention.

As illustrated in FIG. 10, a method of gripping the long member 10 by the supporting robots 4 and the gripping robot 11 according to the present embodiment will now be described.

The supporting robots 4 grip the long member 10 in such positions that the amount of deformation (the amount of bend) of the long member 10 is minimized (step S11). The number of the supporting robots 4 for gripping the long member 10 is determined on the basis of the total length and shape of the long member 10, the operating range of the supporting robots 4, and the like. The gripping positions where the amount of deformation of the long member 10 is minimized are determined through preliminary analysis on the basis of the amount of deformation of the long member 10 from the original shape of the long member 10, for example. If the touch plate 5 is used to restrain an end portion of the long member 10, the restraint imposed by the touch plate 5 is also considered as an analysis condition.

Concerning the gripping positions of the supporting robots 4, it is estimated that, for example, one of the supporting robots 4 grips an end portion of the long member 10 and the supporting robots 4 grip the long member 10 at equal intervals. Precise gripping positions are calculated through analysis and adjusted minutely. Note that the mounting position 21 of the other component 22 mounted on the long member 10 is also considered in the analysis, and thus the amount of deformation of the long member 10 is not always minimized in the gripping positions.

After the long member 10 is taken out from the supplying position 20 to the conveyor 2, the supporting robots 4 bring the end portion of the long member 10 into contact with the touch plate 5. Then, the touch plate 5 restrains the end portion of the long member 10 by a method described later (step S12). This operation restrains the end portion of the long member 10 from moving in all of the X direction, Y direction, and Z direction.

If the touch plate 5 is not used, the hand parts 8 of the supporting robots 4 produce errors, and it is difficult to completely prevent movement of the long member 10. Thus, it is difficult to completely restrain movement in all of the X, Y, and Z directions. Using the touch plate 5 can reduce errors and determine the reference position.

After the touch plate 5 restrains the end portion of the long member 10, the plurality of supporting robots 4 and the gripping robot 11 adjust the gripping position again.

The hand parts 8 of the supporting robots 4 move to positions where the shape of the long member 10 gripped by the supporting robots 4 matches the original shape, on the basis of the original shape of the long member 10 (step S13). The hand part 37 of the gripping robot 11 moves to a position where the shape of the long member 10 supported by the gripping robot 11 matches the original shape, on the basis of the original shape of the long member 10 (step S14).

The original shape is a shape of the long member 10 stored in the memory 35. The memory 35 stores, for example, design dimensions of the long member 10 as the original shape. The destination positions of the hand parts 8, 37 are positions in a coordinate with its reference (zero point) being the reference position, that is, the position where the long member 10 is restrained on the touch plate 5. The coordinates of the destination positions of the hand parts 8, 37 are calculated on the basis of the original shape stored in the memory 35. When the hand parts 8, 37 move on the basis of the X, Y, Z coordinates calculated as the destination positions, the long member 10 is held in such a position that its shape matches the original shape.

Note that even if the hand parts 8 of the supporting robots 4 and the hand part 37 of the gripping robot 11 stop movement with errors in positions, the hand parts 8, 37 have such a configuration as not to restrain the long member 10 in the X direction, that is, in the longitudinal direction of the long member 10, as described above. Thus, tensile force or compressive force is not applied to the long member 10 in the longitudinal direction. Accordingly, the long member 10 is not likely to deform.

As described above, in the present embodiment, the gripping robot 11 produces less positional errors in positioning compared to the supporting robot 4. In adjusting the position and held shape of the long member 10, by the adjusting being performed by the gripping robot 11, which has higher positioning accuracy than the plurality of supporting robots 4, instead of the plurality of supporting robots 4, the positioning accuracy of the mounting position 21 where the other component 22 is mounted is enhanced.

Testing on this matter was conducted to verify the improvement in positioning accuracy provided by the present embodiment, in a case in which the long member 10 is a 7.9 m long stringer, by obtaining via analysis the positional deviation in the mounting position 21 of the stringer in the longitudinal direction when the supporting robots 4 and the gripping robot 11 hold the stringer. The analysis results are illustrated in FIG. 11. The results illustrated in FIG. 11 indicate the maximum value of positional deviation in the mounting position 21 out of 15 mounting positions 21 on the stringer for each condition.

Condition (1)

(1) In a case in which the gripping robot 11 is not used and the stringer is supported by five supporting robots 4, the positioning accuracy of the hand parts 8 of the supporting robots 4 was set to 0.0 mm. The positional deviation in the mounting position 21 of the stringer in the longitudinal direction was 0.012 mm. The reason the positional deviation of the mounting position 21 was not 0.0 mm was because slight bending occurred in the stringer between the supporting robots 4. This bending resulted in a positional deviation in the longitudinal direction is illustrated.

Condition (2)

(2) In a case in which the gripping robot 11 is not used and the stringer is supported by five supporting robots 4, the positioning accuracy of the hand parts 8 of the supporting robots 4 was set to 0.5 mm. The positional deviation in the mounting position 21 of the stringer in the longitudinal direction was 0.186 mm.

Condition (3)

(3) In a case in which the stringer is supported by five supporting robots 4 and the gripping robot 11, the positioning accuracy of the hand parts 8 of the supporting robots 4 was set to 0.5 mm, and the positioning accuracy of the hand part 37 of the gripping robot 11 was set to 0.0 mm. The positional deviation in the mounting position 21 of the stringer in the longitudinal direction was 0.071 mm.

Condition (4)

(4) In a case in which the stringer is supported by five supporting robots 4 and the gripping robot 11, the positioning accuracy of the hand parts 8 of the supporting robots 4 was set to 0.2 mm, and the positioning accuracy of the hand part 37 of the gripping robot 11 was set to 0.0 mm. The positional deviation in the mounting position 21 of the stringer in the longitudinal direction was 0.033 mm.

It was found that in a case in which the target long member 10 for analysis, i.e. the stringer, is provided with the other component 22, i.e. a clip, by setting the positioning accuracy of the hand parts 8 of the supporting robots 4 to 0.2 mm and the positioning accuracy of the hand part 37 of the gripping robot 11 to 0.0 mm as in condition (4), the desired accuracy of the positional deviation in mounting position 21 of 0.063 mm can be satisfied.

Also, it was found that condition (4) compared to condition (2) has enhanced positioning accuracy, and the desired accuracy can be satisfied, as a result, supporting robots 4 may have low positioning accuracy without enhancing the positioning accuracy of all of the supporting robots 4 as in condition (1), but by a single gripping robot 11 with high positioning accuracy supporting the long member 10 along with the plurality of supporting robots 4 with low positioning accuracy as in condition (4).

In other words, according to the present embodiment, by using a single gripping robot 11 with high positioning accuracy and a plurality of supporting robots 4 with lower positioning accuracy than that of the gripping robot 11, the positioning accuracy of the mounting position 21 can be enhanced beyond that of the case in which the long member 10 is supported by only a plurality of supporting robots 4 with low positioning accuracy.

Also, the number of robots provided with a reflector on the hand part can be reduced, and the complexity of the calculations of the positional control and the work involving maintenance of the robots overall can be reduced. The cost of the long member assembling device 1 overall can also be reduced.

A method of bringing the long member 10 into contact with the touch plate 5 by the hand parts 8 of the supporting robots 4 and restraining the end portion of the long member 10 will now be described.

The supporting robots 4 use the hand parts 8 to grip predetermined positions of the long member 10 located in the supplying position 20. These gripping positions may not be as precise as those when the other component 22 is mounted, and are based on positions detected by position detection units of the supporting robots 4 and the conveyor 2.

With the stoppers 13 gripping the long member 10, the supporting robots 4 bring the long member 10 into contact with the touch plate 5. At this time, the floating unit 23 completely brings the end surface (YZ surface) of the first end portion of the long member 10 into surface contact with the flat surface (YZ, surface) of the touch plate 5.

Then, the A reference plane jig 24 and the B reference plane jig 25 of the touch plate 5 sandwich the long member 10 in the order of the A reference plane jig 24 and the B reference plane jig 25. This operation imposes such restraint that the A reference plane and the B reference plane on the long member 10 are in the reference positions. Then, the stoppers 13 of the supporting robots 4 release gripping of the long member 10. The long member 10 may be sandwiched in the order of the B reference plane jig 25 and the A reference plane jig 24, which is the inverse order of the above-described example.

A method of determining the reference coordinate of the long member assembling device according to the present embodiment will now be described.

The reference coordinate is determined by, for example, detecting the reflectors 27 on the two touch plates 5 and using the positions of the detected reflectors 27 as references. Specifically, one of the reflectors 27 on the touch plate 5 disposed on the first end side of the table 3 is detected, and two of the reflectors 27 on the touch plate 5 disposed on the second end side of the table 3 are detected. This operation determines the XY plane and sets the reference coordinate.

Also, the reference point can be set if the reflectors can be mounted directly on the touch plate 5 at the position of the reference point (origin), but if they cannot be directly mounted, the reference point can be set by detecting three reflectors 27 on the touch plate 5 in contact with one end of the long member 10.

In that described above, the reflectors 28, 29 are always provided on the hand parts 17, 37; however, the present invention is not limited to this example. For example, the detection may not be performed by the laser tracker 7 at all times. An error inherent in the mounting robot 6 and the gripping robot 11 may be detected preliminarily by the laser tracker 7 and stored. The reflectors 28, 29 are detached in mounting, and the mounting robot 6 and the gripping robot 11 are mounted in consideration of the stored error. This can enhance precision in mounting the component 22.

The supporting robots 4 and the touch plates 5 are placed on the conveyor 2 in the above description; however, the present invention is not limited to this example. A configuration is possible in which the mounting robot 6 and the gripping robot 11 may be placed on the conveyor in a movable manner relative to the supporting robots 4 and the touch plates 5.

The supporting robots 4 are arranged at predetermined intervals on the table 3 and integrated with the table 3 in the above-described embodiment; however, the present invention is not limited to this example. For example, the supporting robots 4 may be installed in a self-propelled manner on the table 3 on the basis of the length and shape of the long member 10 to be gripped. In this case, positional information on the supporting robots 4 with respect to a reference position on the table 3 is also used to position the hand parts 8 of the supporting robots 4.

REFERENCE SIGNS LIST

1 Long member assembling device
2 Conveyor
3 Table
4 Supporting robot
5 Touch plate
6 Mounting robot
7 Laser tracker
8, 17, 37 Hand part
9, 18, 38 Arm part
10 Long member
11 Gripping robot
12, 19, 39 Trunk part
13 Stopper
13A Fixed component
13B Movable component
14 A reference plane roller part
14A Fixed roller
14B Movable roller
15 B reference plane roller part
15A Fixed roller
15B Movable roller
16 Flat plate part
20 Supplying position
21 Mounting position
22 Component
23 Floating unit
24 A reference plane jig
25 B reference plane jig
26 Support
27 Reflector
30 Control unit 31 Conveyor control unit
32 Supporting robot control unit
33 Mounting robot control unit
34 Gripping robot control unit
35 Memory

The invention claimed is:

1. An assembly body manufacturing device, comprising:
a plurality of first gripping parts configured to grip a first member having a long shape;
a first drive part configured to move each of the plurality of first gripping parts and adjust a position of each of the plurality of first gripping parts gripping the first member;
a second gripping part configured to grip the first member, the second gripping part numbering less than the plurality of first gripping parts;
a second drive part configured to move the second gripping part and adjust a position of the second gripping part gripping the first member, the second drive part having a higher positioning accuracy in positioning adjustment than that of the plurality of first gripping parts driven by the first drive part;
a storage unit configured to store an original shape of the first member; and
a control unit configured to drive the first drive part and the second drive part and adjust positions of the plurality of first gripping parts and the second gripping part on the basis of the original shape of the first member stored in the storage unit such that a shape of the first member gripped by the plurality of first gripping parts and the second gripping part matches the original shape of the first member stored in the storage unit.

2. The assembly body manufacturing device according to claim 1, wherein when positional adjustment is performed by the first drive part or the second drive part, the plurality of first gripping parts or the second gripping part allow the first member to move in a longitudinal direction while gripping the first member.

3. The assembly body manufacturing device according to claim 1, wherein gripping positions of the plurality of first gripping parts or the second gripping part are preliminarily determined on the basis of an original shape of the first member and an amount of deformation of the first member when the plurality of first gripping parts or the second gripping part grip the first member.

4. The assembly body manufacturing device according to claim 1, further comprising a fixing part configured to fix a first end of the first member and restrain movement of the first member in the longitudinal direction.

5. The assembly body manufacturing device according to claim 4, wherein the fixing part is disposed on either end side of the plurality of first gripping parts arranged in a row.

6. The assembly body manufacturing device according to claim 4, wherein a reference point used for adjusting the positions of the plurality of first gripping parts or the second gripping part is determined on the basis of positional information derived from an installation position of the fixing part.

7. The assembly body manufacturing device according to claim 6, wherein a reference coordinate used for adjusting the positions of the plurality of first gripping parts or the second gripping part is determined on the basis of positional information derived from installation positions of two of the fixing parts.

8. The assembly body manufacturing device according to claim 1, further comprising a mounting robot configured to mount a second member on the first member.

9. The assembly body manufacturing device according to claim 8, wherein at least one of the plurality of first gripping parts, the second gripping part, and the mounting robot is movable and relatively changes a position thereof.

10. An assembly body manufacturing method comprising the steps of:
gripping a first member having a long shape with a plurality of first gripping parts;
moving each of the plurality of first gripping parts with a first drive part to adjust positions of the plurality of first gripping parts gripping the first member;
gripping the first member with a second gripping part numbering less than the plurality of first gripping parts;
moving the second gripping part with the second drive part having a higher positioning accuracy in positioning adjustment than that of the plurality of first gripping parts driven by the first drive part to adjust a position of the second gripping part gripping the first member;
driving the first drive part and the second drive part to adjust the positions of the plurality of first gripping parts and the second gripping part with a control unit on the basis of an original shape of the first member stored in a storage unit such that a shape of the first member gripped by the plurality of first gripping parts and the second gripping part matches the original shape; and
mounting a second member on the first member.

11. The assembly body manufacturing method according to claim 10, further comprising the steps of:
fixing a first end of the first member with a fixing part and restraining movement of the first member in a longitudinal direction; and
moving the first member in the longitudinal direction by the plurality of first gripping parts with the plurality of first gripping parts gripping the first member when positional adjustment is performed by the first drive part.

12. The assembly body manufacturing method according to claim 11, further comprising the step of:
releasing the first member from being gripped by the plurality of first gripping parts after the first end of the first member is restrained by the fixing part, and then again gripping the first member with the plurality of first gripping parts.

* * * * *